US005651291A

United States Patent [19]

Lyndhurst

[11] Patent Number: 5,651,291

[45] Date of Patent: Jul. 29, 1997

[54] CRANKCASE FORGING AND FORMING PROCESS

[76] Inventor: Richard Lyndhurst, 2885 Miguel La., Costa Mesa, Calif. 92626

[21] Appl. No.: 209,233

[22] Filed: Mar. 14, 1994

[51] Int. Cl.$^{6}$ .................................................. F16H 57/02

[52] U.S. Cl. .................................................. 74/606 R

[58] Field of Search .................................. 74/606 R, 467

[56] References Cited

U.S. PATENT DOCUMENTS

| | | | |
|---|---|---|---|
| 5,042,320 | 8/1991 | Kikuta et al. . | |
| 5,042,321 | 8/1991 | Hongo et al. | 74/467 X |
| 5,062,311 | 11/1991 | Bennitt | 74/606 R |
| 5,146,748 | 9/1992 | Okada | 74/606 R |
| 5,146,797 | 9/1992 | Annovazzi et al. | 74/606 R |
| 5,156,576 | 10/1992 | Johnson | 74/606 R |
| 5,193,501 | 3/1993 | Klejeski et al. | 74/606 R X |
| 5,207,121 | 5/1993 | Bien | 74/606 R |
| 5,287,769 | 2/1994 | Von Kaler | 74/606 R |
| 5,327,800 | 7/1994 | Van Selous | 74/606 R |

FOREIGN PATENT DOCUMENTS

| | | | |
|---|---|---|---|
| 0548428 | 6/1993 | European Pat. Off. | 74/606 R |
| 0585563 | 3/1994 | European Pat. Off. | 74/606 R |
| 2547007 | 12/1984 | France | 74/606 R |
| 4121299 | 1/1992 | Germany | 74/606 R |
| 61-163021 | 7/1986 | Japan | 74/606 R |
| 590867 | 7/1947 | United Kingdom | 74/606 R |

*Primary Examiner*—Vinh T. Luong
*Attorney, Agent, or Firm*—William W. Haefliger

[57] ABSTRACT

An engine casing is produced by placing a metallic billet between forging dies and rapidly and forcefully closing the dies axially to forge the billet, and includes body structure defining first and second re-entrant body chambers formed at opposite sides of an interior wall, in response to the die closing, and first and second forged body walls extending about the respective first and second chambers, the first wall forged to have a first local thickened section at one side of the first chamber, and the second wall forged to have a second local thickened section at one side of the second wall, the second section offset relative to the first section, the walls and chambers defined by the engine casing; there being a first passage formed axially in the first thickened section and a second passage formed sidewardly into the second thickened section, whereby the passages communicate openly at a nexus at the one side of the second wall; and a cover plate attached to the engine casing to enclose the nexus.

7 Claims, 3 Drawing Sheets

CRANKCASE FORGING AND FORMING PROCESS

BACKGROUND OF THE INVENTION

This invention relates generally to formation or production of engine casings, and more particularly to forging of engine crankcase bodies enabling production of lower cost, substantially stronger crankcases, with greatly diminished risk of porosity and associated problems.

In the past, crankcase bodies were cast from molten metal, such as aluminum. This procedure required complex coring of the body recesses and passages, and relatively extensive machining of cast surfaces. There is need for methods to produce forged crankcases with attendant improvements in quality, higher strength, and reduction in machining requirements.

SUMMARY OF THE INVENTION

It is a major object of the invention to provide an improved method to produce high-quality engine casings, as for example engine crankcase bodies, to meet the above-desired need.

Basically, the method of the invention utilizes forging dies, and includes the steps:

a) placing a heated, metallic billet to be forged between the dies, b) rapidly and forcefully closing the dies axially relatively toward one another to forge the billet, thereby to form first and second re-entrant body chambers at opposite sides of an interior wall, and to forge first and second body walls extending about the respective first and second recesses, the first wall forged to have a first locally thickened section at one side of the first chamber, and the second wall forged to have a second locally thickened section at one side of the second wall, the second section offset relative to the first section, the walls and chambers configured as an engine casing, c) forming a first passage in an axial direction in the first thickened section and forming a second passage sidewardly into the second thickened section, whereby the passages communicate openly at an external nexus at one side of the second wall, d) and providing a cover plate and attaching the cover plate to the engine casing to enclose the first nexus.

As will be seen, the forging method typically employs a billet or slug consisting essentially of aluminum; and the passages are formed and located to function as scavenging passages.

It is another object to provide a method wherein the engine casing has an axis extending in the direction of the die axial relative movement, the first passage is formed to extend generally parallel to that axis, and the second passage is formed to extend generally radially relative to the axis. When so formed, the passages are such as to accept a cover plate formed to have elbow configuration, easily attached to the forged body, as by threaded fasteners.

Another object includes forming the described first and second passages by drilling the body sections, as well as machining smooth attachment surface means on the body, and about the nexus, and attaching the cover plate to the smooth attachment surface means.

Yet another object is to provide apparatus embodying the forged billet of the invention and characterized by:

a) first and second re-entrant body chambers formed at opposite sides of an interior wall, in response to forging die closing, and first and second forged body walls extending about the respective first and second recesses, the first wall forged to have a first local thickened section at one side of the first chamber, and the second wall forged to have a second local thickened section at one side of the second wall, the second section offset relative to the first section, the walls and chambers configured as an engine casing, b) there being a first passage formed axially in the first thickened section and forming a second passage sidewardly into the second thickened section, whereby the passages communicate openly at a nexus at one side of the second wall, c) and a cover plate attached to the engine casing to enclose the nexus, whereby scavenged engine fluid may pass through the passages from one of the chambers to the other.

As will be seen, the forged body means has machined smooth attachment surface means extending about the nexus, the cover plate attached to the surface means.

These and other objects and advantages of the invention, as well as the details of an illustrative embodiment, will be more fully understood from the following specification and drawings, in which:

DRAWING DESCRIPTION

DETAILED DESCRIPTION

Figure 1:
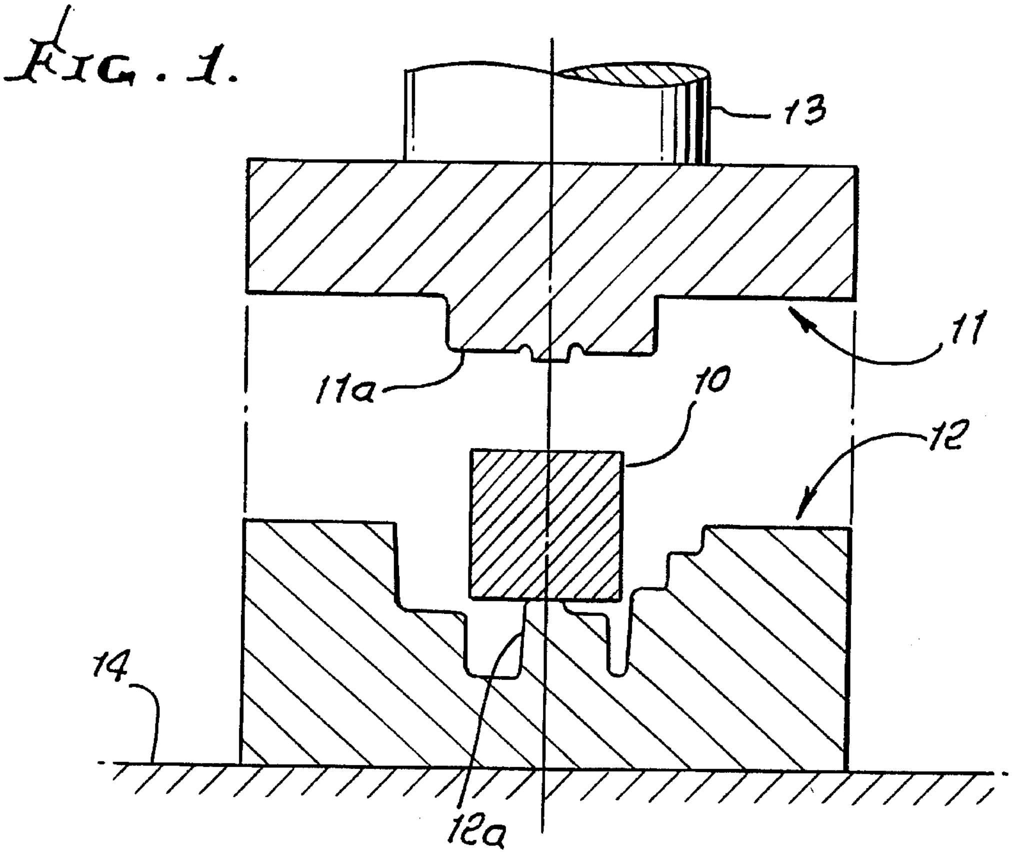
FIG. 1 is a vertical section showing forging dies separated to allow placement of a heated billet therebetween.

As seen in FIG. 1, a billet or slug 10, typically formed of lightweight metal, such as aluminum or aluminum alloy, is placed between upper and lower forging dies 11 and 12. Note forging surfaces **11*a* and 12*a*** of the dies facing the billet.

Figure 2:
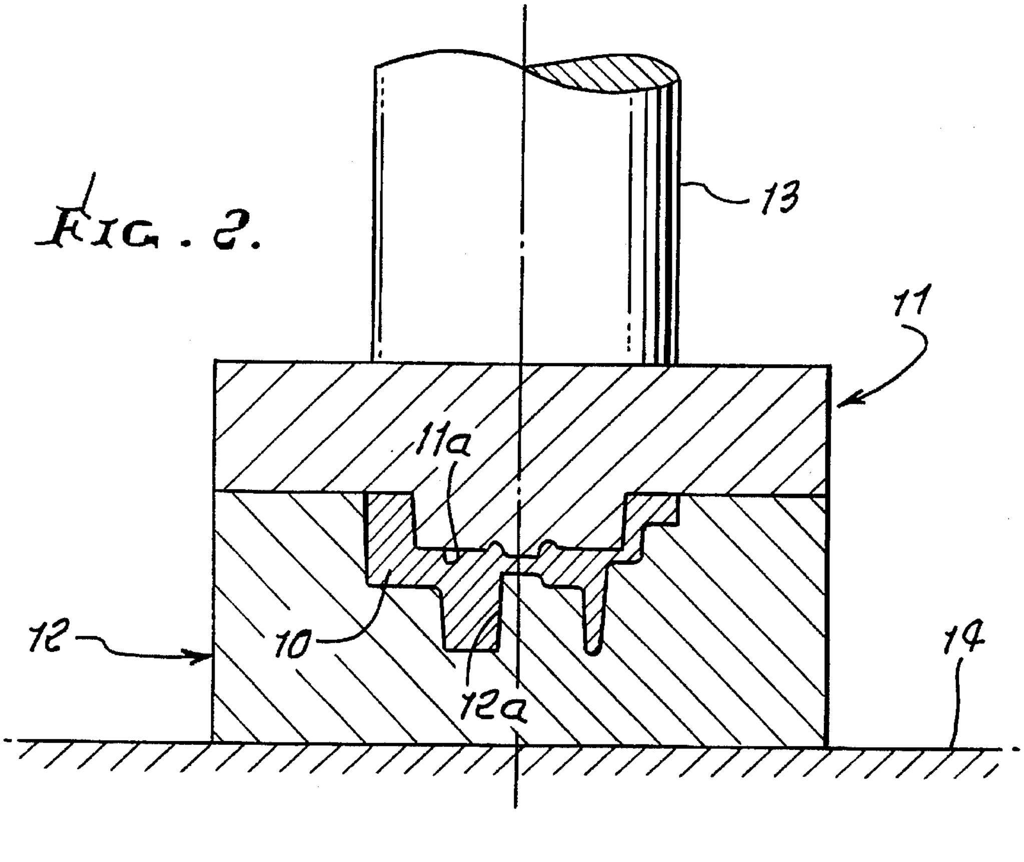
FIG. 2 is a view like FIG. 1 showing the dies closed together and the billet deformed to engine casing shape.

In FIG. 2, a ram 13 has rapidly displaced the upper die downwardly to deform or forge the billet between the dies into engine casing configuration. Note lower die support at 14. Forging produces a superior casing material, free of small voids or imperfections, and having forged grain flow, producing cold working and resultant high strength. Therefore, a forged casing is substantially superior to a cast casing.

Figure 3:
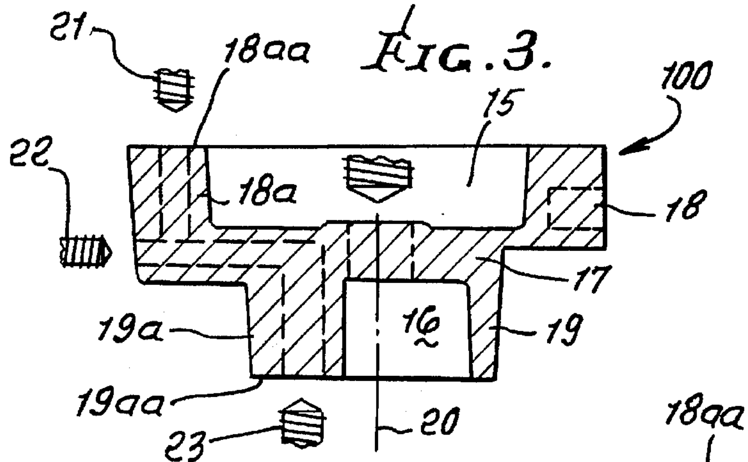
FIG. 3 is a section taken through the forged engine casing as removed from between the forging dies and showing drilling locations.

FIG. 3 shows the resultant forged engine casing 100, as removed from between the dies. It has body means defining first and second re-entrant principal body chambers or recesses 15 and 16, at opposite sides of an interior wall 17. Also, first and second forged body walls **18*a* and 19*a* extend about the chamber, and have thickened sections 18*a* and 19*a*** at the same sides of the two chambers. Section 19*a* is offset toward casing axis 20, relative to section 18*a*; and it is desired to establish communication through sections 18*a* and 19*a*, and wall 17, between end wall location 18*aa* and end wall location 19*aa*, for scavenging fluid flow during crankcase use.

Figure 4:
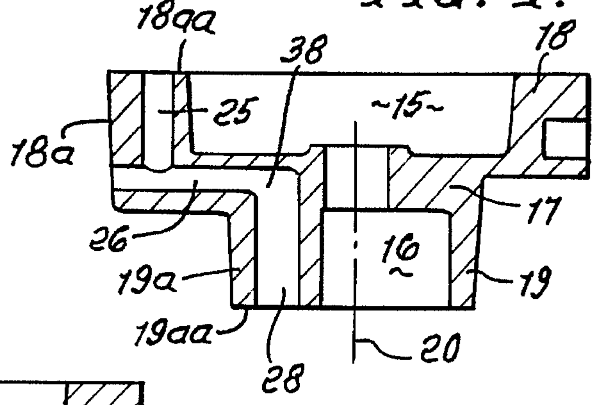
FIG. 4 is a view like FIG. 3 showing the passages in the casing.

FIG. 3 shows drills at 21, 22 and 23, oriented to establish such communication. Referring also to FIG. 4, a first passage 25 is formed in an axial direction in first section 18*a*, as by use of drill 21; a second passage 26 is formed by drill 22 in a generally radial direction in section 19*a* and relative to axis 20, to intersect passage 25, but not to intersect chamber 16; and a third passage 28 is formed by drill 23 in an axial direction in the second section 19*a*, to intersect passage 26. In this regard, it is desired to establish passage communication between locations 18*aa* and 19*aa*, for flow of pressurized liquid in the crankcase.

Figure 5:
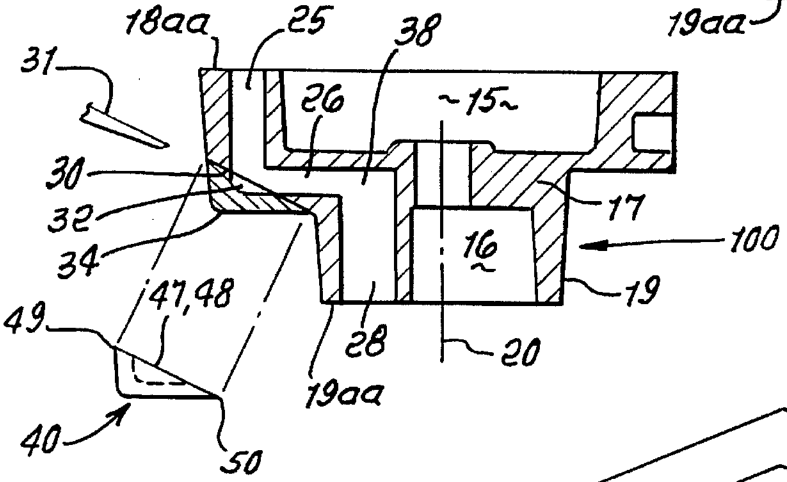
FIG. 5 is a view like FIG. 4 showing machining of a smooth, angled attachment surface on the casing, to intercept two of the passages, for reception of a cover plate.
Figure 6:
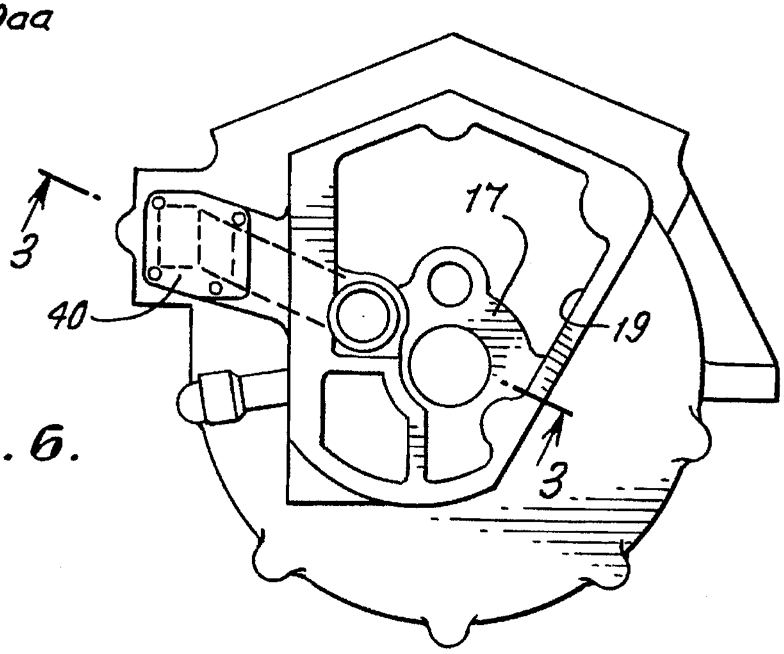
FIG. 6 is an end view of the FIG. 5 casing.

The locus of communication of passages 25 and 26 will be referred to as a first nexus 32 at one side of the second wall 19. It is open to the exterior, as for example after machine tool removal of casing metal along and below plane 30, seen in FIG. 5, and angled relative to axis 20, as shown. A mill tool or cutting tool is shown at 31 for removing such metal. Note that plane 30 typically intersects passage 25 at point or nexus 32 where lower extent of passage 25 is intersected by the outer extent of passage 26. The passages 25 and 26 may be drilled before or after removal of corner metal 34 by tool 31. Passage 28 intersects radially inner extent of passage 26 at a second and internal nexus, seen at 38 in FIGS. 4 and 5.

Figure 7:
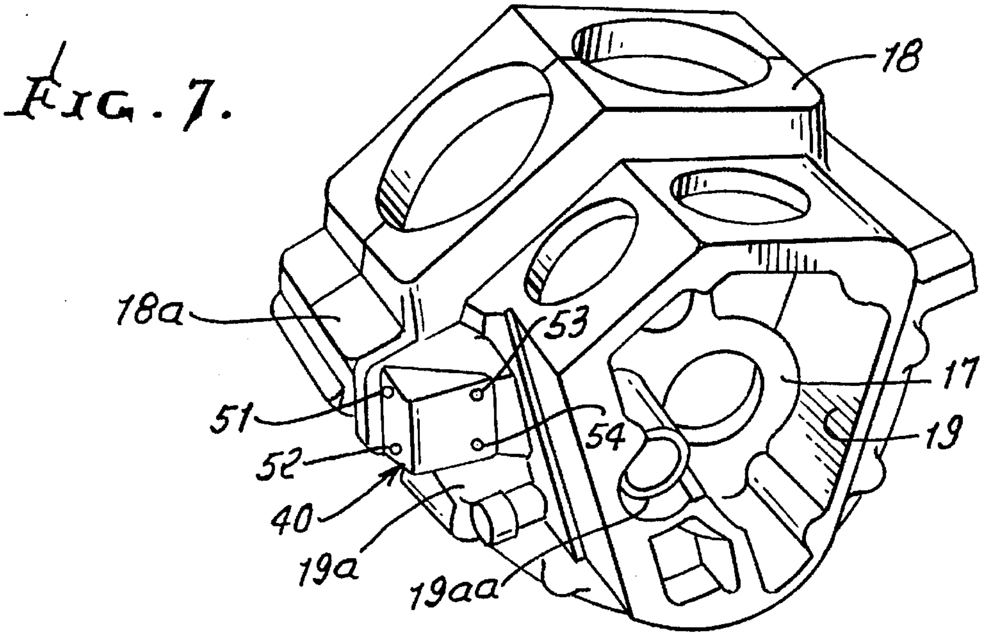
FIG. 7 is a perspective view of the finished engine casing with cover plate attached.
Figure 8:
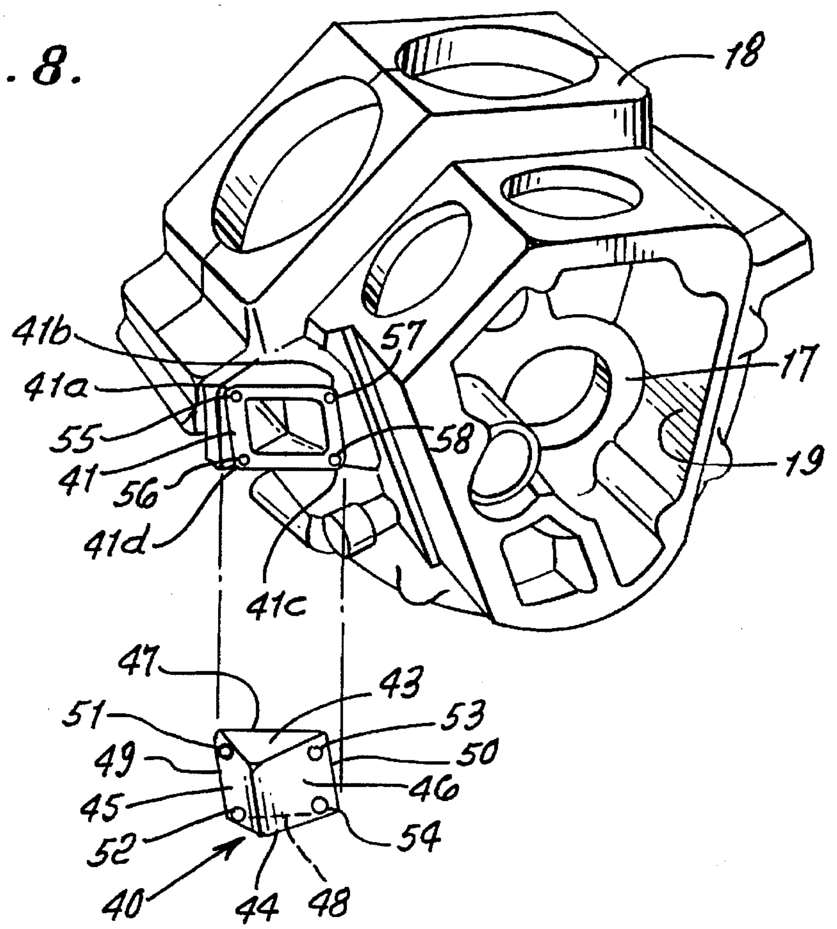
FIG. 8 is a view like FIG. 6 showing the cover plate removed.

A cover plate is provided, as at 40, for attachment to the machined, flat surface 41 (see FIG. 8) to enclose the exposed first nexus 32. The plate is hollow and has the form of an elbow with parallel walls 43 and 44, and end walls 45 and 46, as seen in FIGS. 7 and 8. They form edges, as at 47–50, that are in the plane of machined surface 30, when the elbow is attached to that surface, as by fasteners. See fastener openings 51–54 in FIG. 7 to receive threaded fasteners that penetrate drilled and tapped holes 55–58 in surface 41, i.e., at corners 41*a*–*41d* thereof.

The resultant forged crankcase has a tensile strength of about 65,000 psi, whereas a cast crankcase typically has a tensile strength of about 35,000 psi. Castings have hidden flaws and voids, whereas forgings eliminate such voids and flaws. Also, the forged crankcase is superior in strength, as compared to a cast crankcase, due to grain flow of forged metal that follows the crankcase shape (i.e., flow around corners, etc.), instead of requiring machining in areas that are across the grain (leaving an area of reduced strength).

I claim:

1. An engine casing produced by placing a metallic billet between forging dies and rapidly and forcefully closing said dies axially to forge said billet, comprising a) body means defining first and second re-entrant body chambers formed at opposite sides of an interior wall, in response to said die closing, and first and second forged body walls extending about the respective first and second chambers , the first wall forged to have a first local thickened section at one side of the first chamber, and the second wall forged to have a second local thickened section at one side of the second wall, said second section offset relative to the first section, said walls and chambers defined by said engine casing, b) there being a first passage formed axially in the first thickened section and a second passage formed sidewardly into the second thickened section, whereby said passages communicate openly at a nexus at said one side of the second wall, c) and a cover plate attached to said engine casing to enclose said nexus.

2. The casing of claim 1 which consists essentially of aluminum.

3. The casing of claim 1 wherein said engine casing has an axis, said first passage is formed to extend parallel to said axis, and said second passage is formed to extend radially relative to said axis.

4. The casing of claim 1 wherein said cover plate has hollow elbow configuration.

5. The casing of claim 1 wherein said first and second passages are drilled passages, in said wall sections.

6. The casing of claim 5 wherein said body means has machined smooth attachment surface means extending about said nexus, the cover plate attached to said surface means.

7. The casing of claim 1 wherein said body means has machined smooth attachment surface means extending about said nexus, the cover plate attached to said surface means.

* * * * *